United States Patent [19]

Schmid

[11] 4,103,588

[45] Aug. 1, 1978

[54] CRANKSHAFT MILLING MACHINE AND MILLING TOOL FOR SUCH MACHINE

[75] Inventor: Karlheinz Schmid, Neckartenzlingen, Fed. Rep. of Germany

[73] Assignee: Gebrueder Heller, Maschinenfabrik Gesellschaft mit beschraenkter Haftung, Nuertingen, Fed. Rep. of Germany

[21] Appl. No.: 809,430

[22] Filed: Jun. 23, 1977

[30] Foreign Application Priority Data

Jul. 3, 1976 [DE] Fed. Rep. of Germany ....... 2630047

[51] Int. Cl.² .............................................. B23C 5/08
[52] U.S. Cl. ................................ 90/11 A; 82/DIG. 1; 407/31; 407/120
[58] Field of Search ............... 90/11 R, 11 A; 407/31, 407/120; 82/DIG. 1; 83/16, 171

[56] References Cited

U.S. PATENT DOCUMENTS

| 1,569,518 | 1/1926 | Melling | 90/11 R X |
| 3,491,651 | 1/1970 | Pascoe | 90/11 R |
| 3,786,720 | 1/1974 | Zavodny, Jr. | 90/24 R |

*Primary Examiner*—Gil Weidenfeld
*Attorney, Agent, or Firm*—W. G. Fasse; W. W. Roberts

[57] ABSTRACT

The present milling tool for crankshafts is equipped with an electric heater to assure uniform tool temperatures throughout its operation and to thereby avoid tolerance variations in the milled workpiece. The present milling machine is equipped with contact elements for supplying an electric current to the heater in the milling tool proper.

7 Claims, 2 Drawing Figures

CRANKSHAFT MILLING MACHINE AND MILLING TOOL FOR SUCH MACHINE

BACKGROUND OF THE INVENTION

The present invention relates to a milling tool for machining of crankshafts and to a crankshaft milling machine suitable for cooperation with the present milling tool.

Crankshaft milling machines for machining the bearing journals of crankshafts are well known to comprise working or drive spindles which hold the milling tool proper. Such milling tools comprise a milling mandrel or arbor as well as the milling discs secured to the arbor with axial spacings between adjacent discs. Generally, the number of milling discs corresponds to the number of the bearing journals to be milled.

The spacing of the cutting teeth of the milling discs from the rotational axis of the spindle determines the precise dimension or spacing of the milled bearing journal. This applies especially for the position of the crankshaft bearing fit journal. In order to maintain the spacing between adjacent milling discs as precise as possible, it is known to insert spacer bushings between the adjacent milling discs.

However, practical experience has shown that the spacing between the adjacent, milled bearing journals may differ from one workpiece to another. Thus, correspondingly larger tolerances must be taken into account when designing these crankshafts. Further, it is necessary to take these tolerances also into account in the construction and in the subsequent grinding operation.

OBJECTS OF THE INVENTION

In view of the above, it is the aim of the invention to achieve the following objects, singly or in combination:
to avoid the above mentioned differences in the spacing dimensions between the bearing journals of crankshafts which have been produced by the same milling tool and on the same milling machine;
to avoid the tolerance variation caused by temperature variations, more specifically, to assure that the entire milling tool will be subject to the same temperature;
to heat the milling tool to a uniform working temperature even prior to the beginning of the actual milling work;
to assure that the milling tool will maintain its constant dimensions throughout the milling operation; and
to provide a milling machine capable of employing a heated milling tool.

SUMMARY OF THE INVENTION

The invention takes into account the fact that heretofore the milling tool is cold at the beginning of a milling operation and that the tool heats up during a working day due to the heat that becomes available as a result of the milling operation, whereby the milling tool expands correspondingly in its length, whereby the spacing between the individual milling discs increases relative to a reference point, for example, the spindle tip. Heretofore it was customary to eliminate troublesome heat-up of machine elements by cooling the respective machine element. However, the invention departs from this conventional approach and teaches to heat the milling tool already prior to the milling operation to a temperature which heretofore was reached only after a prolonged operation. The invention further teaches to maintain the milling tool at this temperature throughout the milling operation. In this manner a constant temperature of the milling tool during the entire milling operation is assured which entails the constant length of the milling tool during the milling operation whereby a uniform spacing between the adjacent milling discs and thus between adjacent journal bearings is achieved for all crankshafts milled by the same tool.

According to the invention, the foregoing teachings are realized in a milling tool, especially for milling crankshafts having an arbor and several axially spaced milling discs secured to the arbor, wherein at least one electrical heating element is arranged inside the milling arbor, whereby the contact terminals of the heating element are accessible from the outside of the arbor. If the milling tool is located outside the crankshaft milling machine, it is now possible to connect the heating element or each heating element by means of said contact terminals to a conventional power supply for energizing the heating element or elements.

According to the invention, it is now possible to heat the milling tools which are made ready for replacement of worn milling tools, as well as milling tools which are undergoing maintenance work, for example, when the hard metal milling plates at the tips of the milling discs are exchanged.

Although the purpose of the invention may be achieved by preheating the milling tools and then immediately proceed with the milling operation once the tools are inserted in a milling machine, the invention also contemplates a milling machine capable of providing a continuous heating power supply to the milling tool proper. Thus, according to the invention there is provided a crankshaft milling machine having a working or drive spindle for holding the milling tool which is adapted for the purposes of the present invention by providing the spindle end of the milling machine which receives and holds the milling tool, with terminal contacts which correspond to the terminal contacts at the facing end of the milling tools. These contact terminals in the spindle are operatively connected to slip rings or collectors at the opposite end of the drive spindle. Electrical brush elements are so arranged in the housing of the milling machine that they may cooperate with the collector rings of the spindle. The electrical brush elements are in turn connected to a power source.

BRIEF FIGURE DESCRIPTION:

In order that the invention may be clearly understood, it will now be described, by way of example, with reference to the accompanying drawings, wherein:

FIG. 1 illustrates a partial section through a milling tool according to the invention and through the drive spindle of a milling machine according to the invention; and FIG. 2 illustrates a sectional view through the milling tool according to FIG. 1 along a section line extending substantially perpendicularly to the rotational axis of the milling tool.

DETAILED DESCRIPTION OF PREFERRED EXAMPLE EMBODIMENTS:

Figures 1, 2:
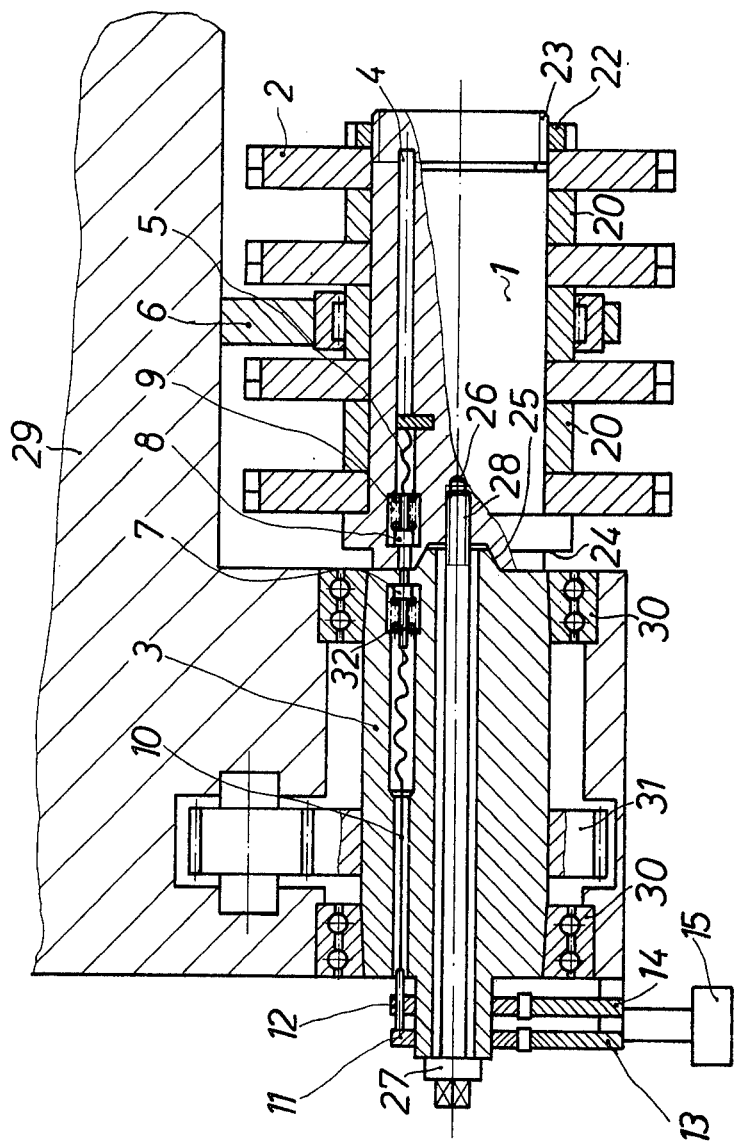

FIG. 1 illustrates a sectional view through a milling machine and a milling tool according to the invention. The present milling tool comprises a milling arbor 1 carrying a plurality of milling discs 2 spaced from each other by means of spacer bushings 20 and secured to the arbor 1 by a nut 22 on the threaded end 23 of the arbor 1.

The arbor 1 also has a flanged or facing end 24 provided with a centering, preferably conical recess 25 and with a threaded bore 26. A securing bolt 27 has a threaded end 28 and extends all the way through the drive spindle 3 of the milling machine 29. The bolt 27 secures the arbor 1 to the spindle 3 in a force transmitting manner. The spindle 3 is supported in the housing of the milling machine 29 by means of bearings 30 and driven by conventional gear means 31. In addition to the bolt 27 the arbor 1 is held by support bearing means 6 in the machine housing which is also conventional.

According to the invention there are provided, for example, four electrical heating elements having the shape of heating rods 4 arranged adjacent to the inner wall of the milling arbor 1. The heating elements 4 are electrically insulated from the arbor 1 and are supplied with electrical energy through conductor means 5 only one of which is illustrated in FIG. 1 for simplicity's sake. The other end of each heating rod 4 will be also connected to a respective electrical conductor not shown. The electrical conductor 5 interconnects one end of its respective heating rod 4 with a terminal contact member 8 which is subject to the bias of a spring 9 so as to extend with its outer tip out of the end face of the arbor 1 adjacent to the spindle 3.

A similar contact terminal 7 is arranged in the spindle 3 subject to the bias of a spring 33 to extend out of the end surface of the spindle 3 which faces the arbor 1. Thus, when the arbor and the spindle are properly interconnected by the bolt 27 and in proper alignment with each other, the terminal contacts 7 and 8 will also be in alignment and in electrical contact with each other at the interface of the arbor 1 and the spindle 3. A conductor 10 connects the terminal contact member 7 to a slip ring 11 arranged at the opposite end of the drive spindle 3. Preferably, the conductor 10 extends inside the spindle from the terminal 7 at the arbor receiving end to said opposite end. A further slip ring 12 is arranged alongside the slip ring or collector 11 for connection or cooperation with a further contact and terminal arrangement as just described but connected to the opposite end of the respective heating rods 4.

The two slip or collector rings 11 and 12 are connected through respective electric brushes 13 and 14 in the housing 29, to a conventional electric power source 15. As mentioned, the conductor elements and the terminal contacts are electrically insulated relative to the milling arbor 1 as well as relative to the drive spindle 3. Such insulation may be part and parcel of the respective conductors and terminals and therefore the insulation is not shown separately.

According to the invention a temperature sensing element 16 such as a bimetal switch or thermoelement is arranged, preferably centrally in the milling arbor 1 which is so connected to the conductor 5 as to switch the electric current on or off depending on the temperature of the milling tool to which the thermoelement 16 may be set. Thus, an automatic temperature control of the heating element 4 or of the heating elements is accomplished so that a separate monitoring of the heating element is obviated. Thus, it is not necessary to check whether the milling toll has reached the desired temperature or whether that temperature has been exceeded inadvertently.

A milling tool according to the invention may be prepared for use automatically by providing a timing relay in the connection to the power source 15, whereby the current through the heating rods 4 may be switched on for a specific length of time prior to the actual use of the milling tool. If the milling tool reaches its operational temperature, the temperature sensing member or thermostat 16 will switch the current off. Should the temperature drop to an undesirable extent prior to the use of the tool, the thermostat will switch on the current again. During the operation of the milling tool the milling discs 2 conduct a portion of the heat generated by the milling operation, whereby the milling arbor 1 takes up such heat proportions so that it will be kept under normal circumstances at this operating temperature. However, if the temperature of the milling arbor should fall below the predetermined operating temperature, the temperature sensing thermostat 16 will again and repeatedly switch the heating current on or off.

It is also possible to connect the milling tool to a power supply source through the terminal contacts 8 when the milling tool or rather its arbor 1 is not connected to the spindle 3. For example, a receptacle having the same contact terminals as shown at 7 in the spindle 3, may be provided for this purpose. Such receptacle would be connected to a power source 15 or any similar current source, however without the need for slip rings and brushes since the milling tool would be stationary in the receptacle so that it may be heated to the desired operating temperature prior to its attachment to the crankshaft milling machine.

Thus, the teachings of the present invention may be realized by heating-up the milling tool prior to its use in the crankshaft milling machine and to begin with the milling operation immediately when the milling tool has been secured to the drive spindle. However, it is preferred to also provide the milling machine with the means required for the heat-up of the milling tool so as to avoid the removal of the tool from the milling machine in case of breakdown times or the like. Thus, as described above, the milling tool may be provided with an alignment mark such as a notch or recess and the spindle will be provided with a respective cooperating mark so that upon the attachment of the milling tool to the spindle, the contact terminals 7, 8 will cooperate with each other in the closing of the power supply circuit to the individual heating elements 4. In this manner the milling tool may be heated even during the milling operation to maintain the desired operating temperature. This feature is especially important and advantageous during the initial milling steps after a milling start or after a prolonged shutdown. Under certain circumstances the heat generated by the milling operation may not be sufficient to maintain the desired uniform and constant operational temperature. Here again the invention provides for the necessary heat supply so that continuously a constant milling temperature is maintained with the resulting constant milling dimensions.

Although the invention has been described with reference to specific example embodiments, it will be appreciated, that it is intended, to cover all modifications and equivalents within the scope of the appended claims.

What is claimed is:

1. A milling tool comprising arbor means, milling discs, means securing said milling discs in spaced relationship on said arbor means, electric heating means operatively disposed inside said arbor means, and electric conductor means operatively disposed to contact said electric heating means and to be accessible from the outside of said arbor means.

2. The milling tool of claim 1, further comprising heat sensor means operatively disposed in said arbor means for controlling the electricity supply to said electric heating means.

3. The milling tool of claim 1, wherein said arbor means comprises a spindle facing end, said electric conductor means comprising electric contact terminal means which are arranged to be accessible at said spindle facing end of said arbor means.

4. The milling tool of claim 3, further comprising spring means for biasing said electric contact terminal means.

5. A milling machine comprising frame means, spindle means operatively supported in said frame means, said spindle means having an arbor receiving and holding end as well as a free end, means for securing a milling arbor to said arbor receiving and holding end, electrical terminal means secured in said spindle means to be accessible at said arbor receiving and holding end, collector means operatively secured to said free end of said spindle means, and electrical conductor means operatively interconnecting said electrical terminal means and said collector means.

6. The machine of claim 5, wherein said electrical conductor means extend through said spindle means.

7. The machine of claim 5, further comprising electrical power source means and electric brush means operatively connecting said electric brush means to said collector means.

* * * * *